United States Patent
Zednickova

(10) Patent No.: US 8,279,584 B2
(45) Date of Patent: Oct. 2, 2012

(54) SOLID ELECTROLYTIC CAPACITOR ASSEMBLY

(75) Inventor: Ivana Zednickova, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 281 days.

(21) Appl. No.: 12/855,088

(22) Filed: Aug. 12, 2010

(65) Prior Publication Data

US 2012/0039019 A1     Feb. 16, 2012

(51) Int. Cl.
*H01G 9/042* (2006.01)
(52) U.S. Cl. ........ 361/529; 361/516; 361/517; 361/518; 361/523; 361/528; 29/25.01; 29/25.03
(58) Field of Classification Search .................. 361/529, 361/516, 517, 518–519, 523–525, 528, 535–538; 29/25.01, 25.03
See application file for complete search history.

(56) References Cited

U.S. PATENT DOCUMENTS

| | | | |
|---|---|---|---|
| 3,345,545 A | 10/1967 | Bourgault et al. |
| 3,922,773 A | 12/1975 | Marien et al. |
| 4,085,435 A | 4/1978 | Galvagni |
| 4,479,168 A | 10/1984 | Green, Jr. |
| 4,755,908 A | 7/1988 | Gardner |
| 4,910,645 A | 3/1990 | Jonas et al. |
| 4,945,452 A | 7/1990 | Sturmer et al. |
| 4,959,430 A | 9/1990 | Jonas et al. |
| 5,111,327 A | 5/1992 | Blohm et al. |
| 5,198,968 A | 3/1993 | Galvagni |
| 5,300,575 A | 4/1994 | Jonas et al. |
| 5,314,606 A | 5/1994 | Irie et al. |
| 5,357,399 A | 10/1994 | Salisbury |
| 5,394,295 A | 2/1995 | Galvagni et al. |
| 5,457,862 A | 10/1995 | Sakata et al. |
| 5,473,503 A | 12/1995 | Sakata et al. |
| 5,495,386 A | 2/1996 | Kulkarni |

(Continued)

FOREIGN PATENT DOCUMENTS

GB          1069685          8/1965

(Continued)

OTHER PUBLICATIONS

Abstract of Japanese Patent No. JP1140621 dated Jun. 1, 1989.

(Continued)

*Primary Examiner* — Nguyen T Ha
(74) *Attorney, Agent, or Firm* — Dority & Manning, P.A.

(57) ABSTRACT

A capacitor assembly that includes a solid electrolytic capacitor element containing an anode body, a dielectric overlying the anode, and a solid electrolyte (e.g., conductive polymer) overlying the dielectric is provided. The anode body is in electrical contact with an anode termination and the solid electrolyte is in electrical contact with a cathode termination. The capacitor element and terminations are encapsulated within a resinous material so that at least a portion of the terminations remain exposed. In addition to enhancing mechanical robustness, the resinous encapsulating material acts in some capacity as a barrier to moisture and oxygen during use, which could otherwise reduce the conductivity of the solid electrolyte and increase ESR. To even further protect the capacitor element, especially at high temperatures, the encapsulated capacitor element is also enclosed and hermetically sealed within a ceramic housing in the presence of an inert gas. It is believed that the ceramic housing is capable of limiting the amount of oxygen and moisture supplied to the conductive polymer of the capacitor. In this manner, the solid electrolyte is less likely to undergo a reaction in high temperature environments, thus increasing the thermal stability of the capacitor assembly.

20 Claims, 2 Drawing Sheets

U.S. PATENT DOCUMENTS

| | | |
|---|---|---|
| 5,586,000 A | 12/1996 | Sakata et al. |
| 5,608,261 A | 3/1997 | Bhattacharyya et al. |
| 5,638,253 A | 6/1997 | Hasegawa |
| 5,694,287 A | 12/1997 | Nishiyama et al. |
| 5,729,428 A | 3/1998 | Sakata et al. |
| 5,812,367 A | 9/1998 | Kudoh et al. |
| 5,949,639 A | 9/1999 | Maeda et al. |
| 5,951,840 A | 9/1999 | Fukaumi et al. |
| 6,052,273 A | 4/2000 | Inoue et al. |
| 6,191,936 B1 | 2/2001 | Webber et al. |
| 6,197,252 B1 | 3/2001 | Bishop et al. |
| 6,322,912 B1 | 11/2001 | Fife |
| 6,369,239 B2 | 4/2002 | Rauchschwalbe et al. |
| 6,391,275 B1 | 5/2002 | Fife |
| 6,416,730 B1 | 7/2002 | Fife |
| 6,527,937 B2 | 3/2003 | Fife |
| 6,528,662 B2 | 3/2003 | Jonas |
| 6,576,099 B2 | 6/2003 | Kimmel et al. |
| 6,592,740 B2 | 7/2003 | Fife |
| 6,635,729 B1 | 10/2003 | Groenendaal et al. |
| 6,639,787 B2 | 10/2003 | Kimmel et al. |
| 6,674,635 B1 | 1/2004 | Fife et al. |
| 6,756,473 B2 | 6/2004 | Reuter et al. |
| 6,891,016 B2 | 5/2005 | Reuter et al. |
| 6,987,663 B2 | 1/2006 | Merker et al. |
| 7,102,016 B2 | 9/2006 | Reuter |
| 7,116,548 B2 | 10/2006 | Satterfield, Jr. et al. |
| 7,118,690 B2 | 10/2006 | Wessling et al. |
| 7,154,740 B2 | 12/2006 | Merker et al. |
| 7,158,368 B2 * | 1/2007 | Fujii et al. ............ 361/540 |
| 7,220,397 B2 | 5/2007 | Kimmel et al. |
| 7,262,511 B2 | 8/2007 | Osaka et al. |
| 7,279,015 B2 | 10/2007 | Merker |
| 7,304,832 B2 | 12/2007 | Ushio et al. |
| 7,312,979 B2 | 12/2007 | Ishizuka et al. |
| 7,341,705 B2 | 3/2008 | Schnitter |
| 7,341,801 B2 | 3/2008 | Reuter et al. |
| 7,358,326 B2 | 4/2008 | Heuer et al. |
| 7,377,947 B2 | 5/2008 | Merker et al. |
| 7,381,396 B2 | 6/2008 | Thomas et al. |
| 7,411,779 B2 | 8/2008 | Merker et al. |
| 7,419,926 B2 | 9/2008 | Schnitter et al. |
| 7,449,588 B2 | 11/2008 | Jonas et al. |
| 7,515,396 B2 | 4/2009 | Biler |
| 7,542,267 B2 * | 6/2009 | Ishijima ............ 361/523 |
| 7,554,793 B2 | 6/2009 | Chacko |
| 7,563,290 B2 | 7/2009 | Qiu et al. |
| 7,582,958 B2 | 9/2009 | Brailey |
| 7,585,983 B2 | 9/2009 | Reuter et al. |
| 7,688,571 B2 | 3/2010 | Ishizuka et al. |
| 7,697,265 B2 | 4/2010 | Umemoto et al. |
| 7,750,099 B2 | 7/2010 | Chikusa et al. |
| 7,785,493 B2 | 8/2010 | Jonas et al. |
| 7,961,454 B2 * | 6/2011 | Matumoto et al. ............ 361/528 |
| 8,125,769 B2 * | 2/2012 | Djebara ............ 361/540 |
| 8,169,774 B2 * | 5/2012 | Hayashi et al. ............ 361/540 |
| 2001/0012193 A1 | 8/2001 | Watanabe et al. |
| 2005/0065352 A1 | 3/2005 | Brassat et al. |
| 2005/0146842 A1 * | 7/2005 | Abe et al. ............ 361/523 |
| 2005/0167789 A1 | 8/2005 | Zhuang |
| 2006/0035143 A1 | 2/2006 | Kida et al. |
| 2006/0180797 A1 | 8/2006 | Merker et al. |
| 2006/0260713 A1 | 11/2006 | Pyszczek et al. |
| 2007/0064376 A1 | 3/2007 | Merker et al. |
| 2008/0005878 A1 | 1/2008 | Merker et al. |
| 2009/0030149 A1 | 1/2009 | Morita et al. |
| 2009/0244812 A1 | 10/2009 | Rawal et al. |
| 2009/0310285 A1 | 12/2009 | Reuter et al. |
| 2009/0318710 A1 | 12/2009 | Brassat et al. |
| 2010/0148124 A1 | 6/2010 | Reuter et al. |
| 2010/0265634 A1 | 10/2010 | Freeman et al. |

FOREIGN PATENT DOCUMENTS

| | | |
|---|---|---|
| JP | 3127813 | 5/1991 |
| JP | 11112157 | 4/1999 |
| JP | 2005217129 | 8/2005 |
| JP | 2006278875 | 10/2006 |
| WO | WO 2009030615 | 3/2009 |
| WO | WO 2009043648 | 4/2009 |
| WO | WO 2009047059 | 4/2009 |
| WO | WO 2009135752 | 11/2009 |
| WO | WO 2009141209 | 11/2009 |
| WO | WO 2010003874 | 1/2010 |
| WO | WO 2010015468 | 2/2010 |
| WO | WO 2010089111 | 8/2010 |
| WO | WO 2010102751 | 9/2010 |

OTHER PUBLICATIONS

Abstract of Japanese Patent No. JP3109712 dated May 9, 1991.
Abstract of Japanese Patent No. JP3109713 dated May 9, 1991.
Abstract of Japanese Patent No. JP3109714 dated May 9, 1991.
Machine Translation of JP2005217129.
Related U.S. Patent Application Form.
Machine Translation of JP2006278875.
Paper—Simpson et al., "Advances and Applications of Inherently Conductive Polymer Technologies Based on Poly(3,4-Ethylenedioxythiophene)," 2005 AIMCAL Fall Technical Conference and 19th International Vacuum Web Coating Conference, Oct. 16-20, 2005, Session 5: Advances in Technology, Myrtle Beach, SC, 10 pages.
Paper—Merker et al., "Conducting Polymer Dispersions for High-Capacitance Tantalum Capacitors,": CARTS Europe 2006, Sep. 2006, Bad Homburg, Germany, 6 pages.
Paper—Freeman et al., "Electrical Characterization of Polymer Tantalum Capacitors with Poly(3,4-Ethylenedioxythiophene) Cathode," Journal of the Electrochemical Society, vol. 156, No. 6, 2009, 10 pages.
Paper—Merker et al., "New Conducting Polymer Dispersions for Solid Electrolytic Capacitors," CARTS Europe 2005, Oct. 17-20, 2005, Prague, CZ Republic, 6 pages.
Paper—Young et al., "Performance and Reliability Study of High Voltage Tantalum Polymer Capacitors," 2010 Electronic Components Association, Inc., Arlington, VA; CARTS 2010 Conference Proceedings, CARTS 2010 Conference, New Orleans, LA, Apr. 2010, 13 pages.
Paper—Merker et al., "Tuning Conducting Polymer Dispersions for High-CV Tantalum Capacitors," CARTS Europe Oct. 29-Nov. 1, 2007, Barcelona, Spain, 6 pages.
Presentation—Freeman et al., "Hermetically Sealed Polymer Tantalum Capacitors," CMSE Europe 2010.

* cited by examiner

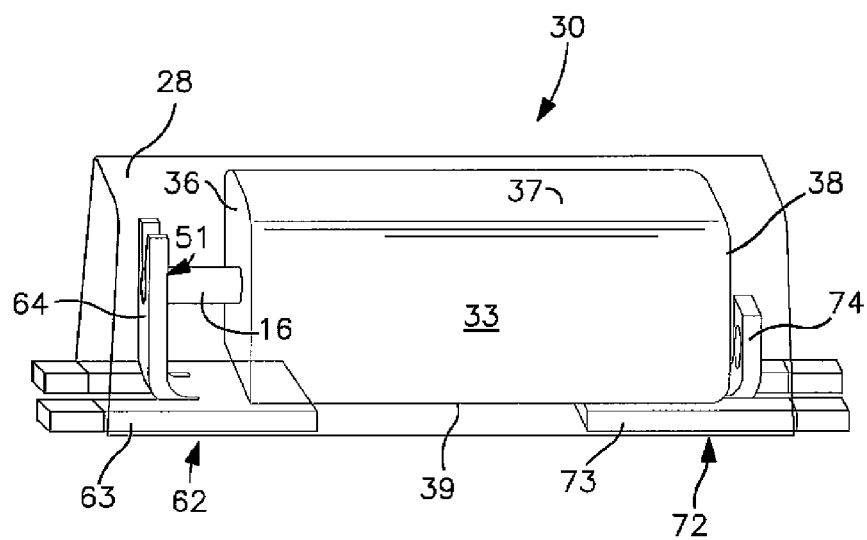
FIG. 1
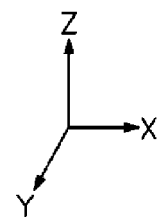

SOLID ELECTROLYTIC CAPACITOR ASSEMBLY

BACKGROUND OF THE INVENTION

Electrolytic capacitors (e.g., tantalum capacitors) are increasingly being used in the design of circuits due to their volumetric efficiency, reliability, and process compatibility. For example, one type of capacitor that has been developed is a solid electrolytic capacitor that includes an anode (e.g., tantalum), a dielectric oxide film (e.g., tantalum pentoxide, $Ta_2O_5$) formed on the anode, a solid electrolyte layer, and a cathode. The solid electrolyte layer may be formed from a conductive polymer, such as described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al. Unfortunately, however, the stability of such solid electrolytes is poor at high temperatures due to the tendency to transform from a doped to an un-doped state, or vice versa. As such, a need currently exists for a solid electrolytic capacitor having improved performance in high temperature environments.

SUMMARY OF THE INVENTION

In accordance with one embodiment of the present invention, a capacitor assembly is disclosed that comprises an electrolytic capacitor and a ceramic housing within which the capacitor is positioned and hermetically sealed, the ceramic housing defining an interior cavity having a gaseous atmosphere and the gaseous atmosphere containing an inert gas. The electrolytic capacitor comprises a capacitor element containing an anode body, dielectric, and solid electrolyte overlying the dielectric, an anode connective member electrically connected to the anode body of the capacitor element, a cathode connective member electrically connected to the solid electrolyte of the capacitor element, and a resinous casing that encapsulates the capacitor element yet leaves at least a portion of the anode connective member and the cathode connective member exposed.

In accordance with another embodiment of the present invention, a method of forming a capacitor assembly is disclosed that comprises positioning an electrolytic capacitor within a ceramic housing, electrically connecting the anode connective member of the capacitor to an anode termination, electrically connecting the cathode connective member of the capacitor to a cathode termination, positioning a lid over the ceramic housing, and hermetically sealing the lid to the ceramic housing in the presence of a gaseous atmosphere containing an inert gas.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which:

FIG. 1 is a perspective view of one embodiment of a capacitor that may be employed in one embodiment of the present.

Figure 2:
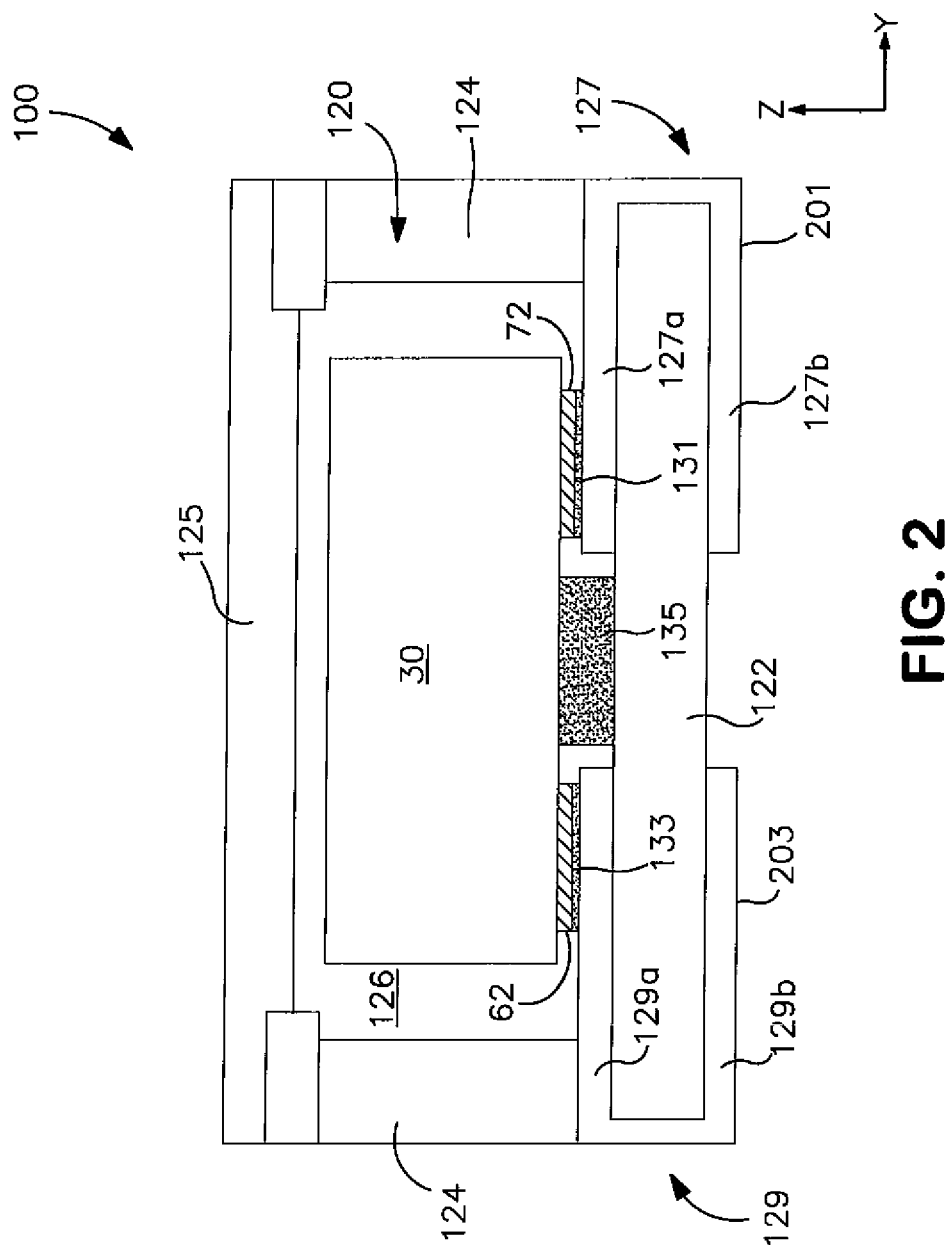
FIG. 2 is a cross-sectional view of one embodiment of the capacitor assembly of the present invention.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a capacitor assembly that includes a solid electrolytic capacitor element containing an anode body, a dielectric overlying the anode, and a solid electrolyte (e.g., conductive polymer) overlying the dielectric. The anode body is in electrical contact with an anode connective member and the solid electrolyte is in electrical contact with a cathode connective member. The capacitor element and connective members are encapsulated within a resinous material so that at least a portion of the connective members remain exposed. In addition to enhancing mechanical robustness, the resinous encapsulating material acts in some capacity as a barrier to moisture and oxygen during use, which could otherwise reduce the conductivity of the solid electrolyte and increase ESR. To even further protect the capacitor element, especially at high temperatures, the encapsulated capacitor element is also enclosed and hermetically sealed within a ceramic housing in the presence of an inert gas. It is believed that the ceramic housing is capable of limiting the amount of oxygen and moisture supplied to the conductive polymer of the capacitor. In this manner, the solid electrolyte is less likely to undergo a reaction in high temperature environments, thus increasing the thermal stability of the capacitor assembly.

Various embodiments of the present invention will now be described in more detail.

I. Solid Electrolytic Capacitor Element

A. Anode Body

The anode body of the capacitor element may be formed from a valve metal composition having a high specific charge, such as about 40,000 μF*V/g or more, in some embodiments about 50,000 μF*V/g or more, in some embodiments about 60,000 μF*V/g or more, and in some embodiments, from about 70,000 to about 700,000 μF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode body. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode body, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), naphthalene, vegetable wax, microwaxes (purified paraffins), polymer binders (e.g., polyvinyl alcohol, poly(ethyl-2-oxazoline), etc), and so forth. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. If desired, any binder/lubricant may be removed after compression by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the anode body may be sintered to form a porous, integral mass. For example, in one embodiment, sintering may occur at a temperature of from about 1200° C. to about 2000° C., and in some embodiments, from about 1500° C. to about 1800° C. under vacuum or an inert atmosphere.

The thickness of the pressed anode body may be relatively thin, such as about 4 millimeters or less, in some embodiments, from about 0.05 to about 2 millimeters, and in some embodiments, from about 0.1 to about 1 millimeter. The shape of the anode body may also be selected to improve the electrical properties of the resulting capacitor. For example, the anode body may have a shape that is curved, sinusoidal, rectangular, U-shaped, V-shaped, etc. The anode body may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

An anode lead may also be connected to the anode body that extends in a longitudinal direction therefrom. The anode lead may be in the form of a wire, sheet, etc., and may be formed from a valve metal compound, such as tantalum, niobium, niobium oxide, etc. Connection of the lead may be accomplished using known techniques, such as by welding the lead to the body or embedding it within the anode body during formation (e.g., prior to compaction and/or sintering).

B. Dielectric

The anode body may be anodized so that a dielectric coating is formed over and/or within the anode. Anodization is an electrochemical process by which the anode is oxidized to form a material having a relatively high dielectric constant. For example, a tantalum anode may be anodized to tantalum pentoxide ($Ta_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. The electrolyte is ionically conductive and may have an ionic conductivity of about 1 milliSiemen per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.

A current is passed through the electrolyte to form the dielectric. The value of voltage manages the thickness of the dielectric. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric may be formed on a surface of the anode and within its pores.

C. Solid Electrolyte

As indicated above, a solid electrolyte overlies the dielectric that generally functions as the cathode for the capacitor. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes. Alternatively, the solid electrolyte may be formed from one or more conductive polymer layers. The conductive polymer(s) employed in such layers are typically π-conjugated and have electrical conductivity after oxidation or reduction, such as an electrical conductivity of at least about 1 μS cm$^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Suitable polythiophenes may include, for instance, polythiophene and derivatives thereof, such as poly(3,4-ethylenedioxythiophene) ("PEDT"). In one particular embodiment, a polythiophene derivative is employed with recurring units of general formula (I), (II) or a combination thereof:

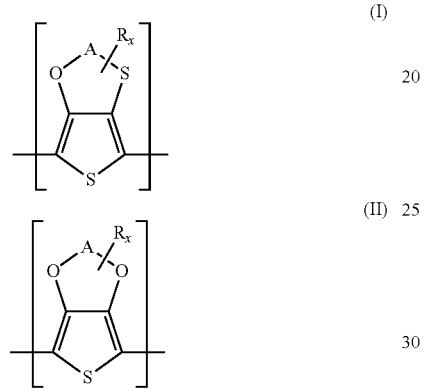

wherein,

A is an optionally substituted $C_1$ to $C_5$ alkylene radical (e.g., methylene, ethylene, n-propylene, n-butylene, n-pentylene, etc.);

R is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and x is an integer from 0 to 8, in some embodiments, from 0 to 2, and in some embodiments, x is 0. Example of substituents for the radicals "A" or "R" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

The total number of recurring units of general formula (I) or formula (II) or of general formulae (I) and (II) is typically from 2 to 2,000, and in some embodiments, from 2 to 100.

Particularly suitable polythiophene derivatives are those in which "A" is an optionally substituted $C_2$ to $C_3$ alkylene radical and x is 0 or 1. In one particular embodiment, the polythiophene derivative is PEDT and has recurring units of formula (II), wherein "A" is $CH_2$—$CH_2$ and "x" is 0. Methods for forming such polythiophene derivatives are well known in the art and described, for instance, in U.S. Pat. No. 6,987,663 to Merker, et al., which is incorporated herein in its entirety by reference thereto for all purposes. For example, the polythiophene derivatives may be formed from a monomeric precursor, such as optionally substituted thiophenes. Particularly suitable monomeric precursors are substituted 3,4-alkylenedioxythiophenes having the general formula (III), (IV) or a combination thereof:

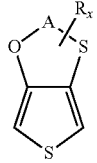

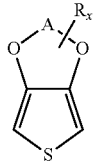

wherein, A, R, and X are as defined above.

Examples of such monomeric precursors include, for instance, optionally substituted 3,4-ethylenedioxythiophenes. Derivatives of these monomeric precursors may also be employed that are, for example, dimers or trimers of the above monomeric precursors. Higher molecular derivatives, i.e., tetramers, pentamers, etc. of the monomeric precursors are suitable for use in the present invention. The derivatives may be made up of identical or different monomer units and used in pure form and in a mixture with one another and/or with the monomeric precursors. Oxidized or reduced forms of these precursors may also be employed.

To produce the desired conductive polymer, monomeric precursors, such as described above, typically undergo oxidative polymerization in the presence of an oxidizing agent. The oxidizing agent may be a transition metal salt, such as a salt of an inorganic or organic acid that contain iron(III), copper(II), chromium(VI), cerium(IV), manganese(IV), manganese(VII), or ruthenium(III) cations. Particularly suitable transition metal salts include iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanois (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable for use in the present invention.

Various methods may be utilized to apply the solid electrolyte onto the anode part. In one embodiment, the oxidizing agent and monomeric precursor are applied, either sequentially or together, such that the polymerization reaction occurs in situ on the part. Suitable application techniques may include screen-printing, dipping, electrophoretic coating, and spraying, may be used to form a conductive polymer coating. As an example, the monomeric precursor (e.g., 3,4-ethylene-dioxy-thiophene) may initially be mixed with the oxidizing agent to form a solution. One suitable oxidizing agent is CLEVIOS™ C, which is iron III toluene-sulfonate and sold by H.C. Starck. CLEVIOS™ C is a commercially available catalyst for CLEVIOS™ M, which is 3,4-ethylene dioxythiophene, a PEDT monomer also sold by H.C. Starck. Once the mixture is formed, the anode part may then be dipped into the solution so that the polymer forms on the surface of the anode part. Alternatively, the oxidizing agent and precursor may also be applied separately to the anode part. In one embodiment, for example, the oxidizing agent is dissolved in an organic solvent (e.g., butanol) and then applied to the anode part as a dipping solution. The anode part may then be dried to remove the solvent therefrom. Thereafter, the anode part may be dipped into a solution containing the appropriate monomer.

As the monomer contacts the surface of the anode part containing the oxidizing agent, it may chemically polymerize thereon. Polymerization may be performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Publication No. 2008/232037 to Biler. Still other methods for applying such conductive polymer coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In addition to in situ application, the solid electrolyte may also be applied to the part in the form of a dispersion of solid conductive polymer particles. Although their size may vary, it is typically desired that the particles possess a small diameter to increase the surface area available for adhering to the anode part. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymers into a particulate form may be enhanced by using a separate counterion to counteract a charged conductive polymer (e.g., polythiophene). That is, the conductive polymer (e.g., polythiophene or derivative thereof) used in the solid electrolyte typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in a given layer of the solid electrolyte is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization.

In addition to conductive polymer(s) and optional counterion(s), the dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking. Other components may also be included within the dispersion as is known in the art, such as dispersion agents (e.g., water), fillers (e.g., carbon black), surface-active substances, etc.

As indicated above, the solid electrolyte may be formed from one or multiple layers. When multiple layers are employed, they may be formed from a conductive polymer that is formed in situ and/or from a polymeric dispersion. Each layer may be formed using one or more coating steps. For example, the solid electrolyte may include a first conductive polymer layer that is in contact with the dielectric, such as a conductive polymer (e.g., PEDT) formed through in situ polymerization of an oxidizing agent and monomeric precursor. The solid electrolyte may also a second conductive polymer layer that generally overlies the first layer and may be formed from a dispersion of particles that contains a conductive polymer (e.g., PEDT), binder, and an optional counterion (e.g., PSS). One benefit of employing such a dispersion is that it may be able to penetrate into the edge region of the capacitor body to achieve good electrical contact with the inner layer and increase the adhesion to the capacitor body. This results in a more mechanically robust part, which may reduce equivalent series resistance and leakage current.

Regardless of the particular manner in which it is formed, the solid electrolyte may be healed upon application to the anode part. Healing may occur after each application of a solid electrolyte layer or may occur after the application of the entire coating if multiple layers are employed. In some embodiments, for example, the solid electrolyte may be healed by dipping the pellet into an electrolyte solution, such as a solution of acid, and thereafter applying a constant voltage to the solution until the current is reduced to a preselected level. If desired, such healing may be accomplished in multiple steps. After application of some or all of the layers described above, the resulting part may then be washed if desired to remove various byproducts, excess oxidizing agents, and so forth. Further, in some instances, drying may be utilized after some or all of the dipping operations described above. For example, drying may be desired after applying the oxidizing agent and/or after washing the pellet in order to open the pores of the part so that it can receive a liquid during subsequent dipping steps.

D. Other Layers

If desired, the part may optionally be applied with one or more additional layers, such as an external coating that overlies the solid electrolyte. The external coating may contain at least one carbonaceous layer and at least one metal layer that overlies the carbonaceous layer. The metal layer may act as a solderable conductor, contact layer, and/or charge collector for the capacitor, and may be formed from a conductive metal, such as copper, nickel, silver, nickel, zinc, tin, palladium, lead, copper, aluminum, molybdenum, titanium, iron, zirconium, magnesium, and alloys thereof. Silver is a particularly suitable conductive metal for use in the layer. The carbonaceous layer may limit contact between the metal layer and the solid electrolyte, which would otherwise increase the resistance of the capacitor. The carbonaceous layer may be formed from a variety of known carbonaceous materials, such as graphite, activated carbon, carbon black, etc. The thickness of the carbonaceous layer is typically within the range of from about 1 µm to about 50 µm, in some embodiments from about 2 µm to about 30 µm, and in some embodiments, from about 5 µm to about 10 µm. Likewise, the thickness of the metal layer is typically within the range of from about 1 µm to about 100 µm, in some embodiments from about 5 µm to about 50 µm, and in some embodiments, from about 10 µm to about 25 µm.

A protective coating may also be employed between the dielectric and the solid electrolyte. The protective coating may include a relatively insulative resinous material (natural or synthetic). Such materials may have a specific resistivity of greater than about 10 Ω/cm, in some embodiments greater than about 100, in some embodiments greater than about 1,000 Ω/cm, in some embodiments greater than about $1\times10^5$ Ω/cm, and in some embodiments, greater than about $1\times10^{10}$ Ω/cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

II. Connective Members

As indicated above, the capacitor assembly contains an anode connective member in electrical contact with the anode body and a cathode connective member in electrical contact with the solid electrolyte. Any conductive material may be employed to form the connective members, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the connective members is generally selected to minimize the thickness of the capacitor. For instance, the thickness of the connective members may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the connective members may be electroplated with nickel, silver, gold, tin, etc. as is known in the art to ensure that the final part is mountable to the circuit board. In one particular embodiment, both surfaces of the connective members are plated with nickel and silver flashes, respectively, while the mounting surface is also plated with a tin solder layer.

The manner in which the connective members are connected to the capacitor element may vary as is known in the art. Referring to FIG. 1, one particular embodiment of a capacitor 30 is shown that includes an anode connective member 62 and a cathode connective member 72 in electrical connection with a single capacitor element 33. It should also be understood that multiple capacitor elements (e.g., two) may be connected to common connective members. In the illustrated embodiment, the capacitor element 33 has an upper surface 37, lower surface 39, front surface 36, and rear surface 38. Although it may be in electrical contact with any of the surfaces of the capacitor element 33, the cathode connective member 72 in the illustrated embodiment is in electrical contact with the lower surface 39 and rear surface 38. More specifically, the cathode connective member 72 contains a first component 73 positioned substantially perpendicular to a second component 74. The first component 73 is in electrical contact and generally parallel with the lower surface 39 of the capacitor element 33. The second component 74 is in electrical contact and generally parallel to the rear surface 38 of the capacitor element 33. Although depicted as being integral, it should be understood that these portions may alternatively be separate pieces that are connected together, either directly or via an additional conductive element (e.g., metal).

The anode connective member 62 likewise contains a first component 63 positioned substantially perpendicular to a second component 64. The first component 63 is in electrical contact and generally parallel with the lower surface 39 of the capacitor element 33. The second component 64 contains a region 51 that carries an anode lead 16. In the illustrated embodiment, the region 51 possesses a "U-shape" for further enhancing surface contact and mechanical stability of the lead 16.

A variety of known techniques may be employed to attach the electrolytic capacitor element 33 to the connective members, such as welding, adhesive bonding, etc. In one embodiment, for example, a conductive adhesive (not shown) is used to attach the capacitor element 33 to the cathode connective member 72. The conductive adhesive may, for example, be positioned between the capacitor element 33 and the first component 72 and/or second component 74. If desired, an insulating material (not shown), such as a plastic pad or tape, may also be positioned between the lower surface 39 of the capacitor element 33 and the first component 63 of the anode connective member 62 to electrically isolate the anode and cathode connective members. The anode of the capacitor element 33 may likewise be connected to the region 51 via an anode lead 16 through welding (e.g., mechanical or laser).

III. Resinous Encapsulant Material

Once attached, the capacitor element and the respective connective members are encapsulated within a resinous material. The resinous material is configured to provide mechanical robustness and stability to the capacitor, as well as to act as a barrier to oxygen and/or moisture. Although a variety of resinous materials may fulfill these functions, it is generally desired to use a resin that is a curable thermosetting resin, such as an epoxy resin, melamine resin, maleimide resin, polyimide resin, phenolic resin, etc. Epoxy resins are particularly suitable for use in the present invention. Examples of suitable epoxy resins include, for instance, glycidyl ether type epoxy resins, such as bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins, etc. Still other suitable conductive adhesive resins may also be described in U.S. Patent Application Publication No. 2006/0038304 to Osako, et al. and U.S. Pat. No. 7,554,793 to Chacko, which are incorporated herein in their entirety by reference thereto for all purposes. Typically, the resinous material constitutes from about 0.5 wt. % to about 50 wt. %, in some embodiments from about 1 wt. % to about 25 wt. %, and in some embodiments, from about 2 wt. % to about 15 wt. % of the dry weight of the adhesive.

If desired, curing agents may also be employed in the encapsulant to help promote curing. The curing agents typically constitute from about 0.1 to about 20 wt. % of the adhesive. Exemplary curing agents include, for instance, amines, peroxides, anhydrides, phenol compounds, acid anhydride compounds and combinations thereof. Specific examples of suitable curing agents are dicyandiamide, 1-(2 cyanoethyl) 2-ethyl-4-methylimidazole, 1-benzyl 2-methylimidazole, ethyl cyano propyl imidazole, 2-methylimidazole, 2-phenylimidazole, 2-ethyl-4-methylimidazole, 2-undecylimidazole, 1-cyanoethyl-2-methylimidazole, 2,4-dicyano-6,2-methylimidazolyl-(1)-ethyl-s-triazine, and 2,4-dicyano-6,2-undecylimidazolyl-(1)-ethyl-s-triazine, imidazolium salts (such as 1-cyanoethyl-2-undecylimidazolium trimellitate, 2-methylimidazolium isocyanurate, 2-ethyl-4-methylimidazolium tetraphenylborate, and 2-ethyl-1,4-dimethylimidazolium tetraphenylborate, etc. Still other useful curing agents include phosphine compounds, such as tributylphosphine, triphenylphosphine, tris (dimethoxyphenyl)phosphine, tris(hydroxypropyl)phosphine, and tris(cyanoethyl)phosphine; phosphonium salts, such as tetraphenylphosphonium-tetraphenylborate, methyltributylphosphonium-tetraphenylborate, and methyltricyanoethylphosphonium tetraphenylborate); amines, such as 2,4,6-tris(dimethylaminomethyl)phenol, benzylmethylamine, tetramethylbutylguanidine, N-methylpiperazine, and 2-dimethylamino-1-pyrroline; ammonium salts, such as triethylammonium tetraphenylborate; diazabicyclo compounds, such as 1,5-diazabicyclo[5,4,0]-7-undecene, 1,5-diazabicyclo[4,3,0]-5-nonene, and 1,4-diazabicyclo[2,2,2]-octane, salts of diazabicyclo compounds such as tetraphenylborate, phenol salt, phenolnovolac salt, and 2-ethylhexanoic acid salt; and so forth.

Still other additives may also be employed, such as photoinitiators, viscosity modifiers, suspension aiding agents, pigments, stress reducing agents, coupling agents (e.g., silane coupling agents), nonconductive fillers (e.g., clay, silica, alumina, etc.), stabilizers, etc. Suitable photoinitiators may include, for instance, benzoin, benzoin methyl ether, benzoin ethyl ether, benzoin n-propyl ether, benzoin isobutyl ether, 2,2 dihydroxy-2-phenylacetophenone, 2,2-dimethoxy-2-phenylacetophenone 2,2-diethoxy-2-phenylacetophenone, 2,2-diethoxyacetophenone, benzophenone, 4,4-bisdialylaminobenzophenone, 4-dimethylaminobenzoic acid, alkyl 4-dimethylaminobenzoate, 2-ethylanthraquinone, xanthone, thioxanthone, 2-cholorothioxanthone, etc. When employed, such additives typically constitute from about 0.1 to about 20 wt. % of the total composition.

A variety of techniques may be employed to encapsulate the capacitor with the resinous material. For example, the capacitor element is typically positioned within a case and filled with the resinous material. The width and length of the case may vary depending on the intended application. Suitable cases may include, for instance, "A", "B", "F", "G", "H", "J", "K", "L", "M", "N", "P", "R", "S", "T", "W", "Y", or "X" cases (AVX Corporation). Once applied, the resinous material is then cured so that it hardens.

The resulting capacitor thus contains the capacitor element within a resin casing with at least a portion of the anode and cathode connective members remaining exposed. Referring again to FIG. 1, for example, the capacitor element 33 is shown as being encapsulated within a resinous casing 28. As illustrated, the portion 63 of the anode connective member 62 and the portion 73 of the cathode connective member 72 remain exposed on a lower surface of the capacitor. It should be understood, however, that any portion of the connective members may remain exposed. For example, the portions 64 and/or 74 may also remain exposed. Likewise, the anode and cathode connective members may be shaped into other various configurations as is known in the art.

IV. Ceramic Housing

Upon encapsulation, the resulting capacitor is enclosed and hermetically sealed within a ceramic housing. Hermetic sealing occurs in the presence of a gaseous atmosphere that contains at least one inert gas so as to inhibit oxidation of the solid electrolyte (e.g., conductive polymer) during use. The inert gas may include, for instance, nitrogen, helium, argon, xenon, neon, krypton, radon, and so forth, as well as mixtures thereof. Typically, inert gases constitute the majority of the atmosphere within the ceramic housing, such as from about 50 wt. % to 100 wt. %, in some embodiments from about 75 wt. % to 100 wt. %, and in some embodiments, from about 90 wt. % to about 99 wt. % of the atmosphere. If desired, a relatively small amount of non-inert gases may also be employed, such as carbon dioxide, oxygen, water vapor, etc. In such cases, however, the non-inert gases typically constitute 15 wt. % or less, in some embodiments 10 wt. % or less, in some embodiments about 5 wt. % or less, in some embodiments about 1 wt. % or less, and in some embodiments, from about 0.01 wt. % to about 1 wt. % of the atmosphere within the ceramic housing. For example, the moisture content (expressed in terms of relatively humidity) may be about 10% or less, in some embodiments about 5% or less, in some embodiments about 1% or less, and in some embodiments, from about 0.01 to about 5%.

The ceramic housing may include one or more layers of a ceramic material, such as aluminum nitride, aluminum oxide, silicon oxide, magnesium oxide, calcium oxide, and so forth. The width and length of the ceramic housing may vary depending on the intended application. In one embodiment, for example, the length of the housing (−y direction in FIG. 2) is from about 2 to about 15 millimeters, in some embodiments from about 2.5 to about 12 millimeters, and in some embodiments, from about 3 to about 7 millimeters. The width of the housing may range from about 1 to about 15 millimeters, in some embodiments from about 1.5 to about 10 millimeters, and in some embodiments, from about 2.0 to about 4.5 millimeters. The overall height of the housing (−z direction in FIG. 2) may optionally remain small so that the resultant assembly is readily incorporated into low profile products. For example, the thickness of the housing may be about 6 millimeters or less, in some embodiments, from about 0.4 to about 5.5 millimeters, and in some embodiments, from about 0.5 to about 4.5 millimeters.

When it is desired to mount the resulting capacitor assembly onto a surface, the assembly may be provided with external anode and cathode terminations for such a purpose. In certain embodiments, for example, the above-referenced cathode connective members may simply extend through the ceramic housing so that they can also function as the external terminations. Alternatively, it may be desired to employ separate external anode and cathode terminations (e.g., pins, pads, sheets, plates, frames, etc.) that are electrically connected to the anode and cathode connective members, respectively. The thickness or height of such terminations is generally selected to minimize the thickness of the capacitor assembly. For instance, the thickness may range from about 0.05 to about 1 millimeter, in some embodiments from about 0.05 to about 0.5 millimeters, and from about 0.1 to about 0.2 millimeters. If desired, the surface of the terminations may be electroplated with nickel, silver, gold, tin, etc. as is known in the art to ensure that the final part is mountable to the circuit board.

In one particular embodiment, the termination(s) are deposited with nickel and silver flashes, respectively, and the mounting surface is also plated with a tin solder layer. In another embodiment, the termination(s) are deposited with thin outer metal layers (e.g., gold) onto a base metal layer (e.g., copper alloy) to further increase conductivity.

Referring to FIG. 2, one particular embodiment of a capacitor assembly 100 is shown in which the capacitor 30 is connected to a ceramic housing 120 through separate anode and cathode terminations 127 and 129, respectively. More specifically, the ceramic housing 120 includes a lower wall 122 and two opposing sidewalls 124 between which a cavity 126 is formed that includes the capacitor 20. The lower wall 122 and sidewalls 124 are formed from one or more layers of a ceramic material such as described above. In this particular embodiment, the terminations extend through the ceramic housing to connect with the anode and cathode connective members. More specifically, the anode termination 127 contains a first region 127*a* that is positioned within the ceramic housing 120 and electrically connected to an exposed portion of the anode connective member 62 and a second region 127*b* that is positioned external to the housing 120 and provides a mounting surface 201. Likewise, the cathode termination 129 contains a first region 129*a* that is positioned within the ceramic housing 120 and electrically connected to the exposed portion of a cathode connective member 72 of the electrolytic capacitor 20 and a second region 129*b* that is positioned external to the housing 120 and provides a mounting surface 203. It should be understood that the entire portion of such regions need not be positioned within or external to the housing.

The attachment of the terminations 127 and 129 to the connective members 62 and 72, respectively, may be made using any known technique, such as welding, laser welding, conductive adhesives, etc. In one particular embodiment, for example, a conductive adhesive 131 is used to connect the anode connective member 62 to the anode termination 127. Likewise, a conductive adhesive 133 is used to connect the cathode connective member 72 to the cathode termination 129. The conductive adhesives may be formed from conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes.

If desired, an adhesive 135 (e.g., conductive adhesives, insulative adhesives, etc.) may also be employed to directly connect a surface of the capacitor 30 with the ceramic housing 120. Although not required, the additional adhesive may help improve the dimensional stability of the capacitor 30 during use.

Of course, other techniques may also be employed to attach the capacitor within the ceramic housing. In alternative embodiments, for example, the anode and cathode connective members may be connected to the ceramic housing via conductive traces that extend through the housing. Any conductive material may be employed to form the traces, such as described above. The traces may be formed using any known technique, such as by printing or coating an ink containing the metal onto a surface of the housing. Various techniques for providing conductive traces in a ceramic housing are described in more detail in U.S. Pat. No. 5,314,606 to Irie, et al. and U.S. Pat. No. 7,304,832 to Ushio, et al., as well as U.S.

Patent Application Publication No. 2005/0167789 to Zhuang and 2007/0138606 to Brailey, all of which are incorporated herein in their entirety by reference thereto for all purposes.

Regardless of the manner in which the capacitor is connected, the resulting package is hermetically sealed as described above. Referring to FIG. 2, for instance, a lid 125 may be placed on an upper surface of the side walls 124 after the capacitor 30 is positioned within the ceramic housing 120. The lid 125 may be formed from a ceramic, metal (e.g., iron, copper, nickel, cobalt, etc., as well as alloys thereof), and so forth. In one embodiment, for example, the lid contains a Kovar® alloy (Carpenter Technology Corporation), which is a nickel-cobalt ferrous alloy. The size of the housing 120 is generally such that the lid 125 does not contact any surface of the capacitor 30 so that it is not contaminated. When placed in the desired position, the lid 125 is hermetically sealed to the sidewalls 124 using known techniques, such as welding (e.g., resistance welding, laser welding, etc.), soldering, etc. Hermetic sealing generally occurs in the presence of inert gases as described above so that the resulting assembly is substantially free of reactive gases, such as oxygen or water vapor.

Although not required, other layers and/or materials may also be employed in the ceramic housing 120. For example, one or more barrier members (not shown) may be formed on the lower wall 122, sidewall(s) 124, and/or lid 125 to inhibit damage to the capacitor 30 during hermetic sealing of the assembly. The barrier member(s) may be formed from any materials known in the art, such as antireflection materials that are capable of preventing a laser beam from being reflected. Examples of such materials may include polymers, such as epoxy resins, polyimides, polyolefins (e.g., polyethylene or polypropylene), optionally containing filler particles (e.g., black pigment).

As a result of the present invention, the capacitor assembly may exhibit excellent electrical properties even when exposed to high temperature environments. For example, the capacitor assembly may have an equivalence series resistance ("ESR") of less than about 50 ohms, in some embodiments less than about 25 ohms, in some embodiments from about 0.01 to about 10 ohms, and in some embodiments, from about 0.05 to about 5 ohms, measured at an operating frequency of 100 kHz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 $\mu A/\mu F*V$, in some embodiments less than about 0.5 $\mu A/\mu F*V$, and in some embodiments, less than about 0.1 $\mu A/\mu F*V$, where $\mu A$ is microamps and $uF*V$ is the product of the capacitance and the rated voltage.

The present invention may be better understood by reference to the following examples.

Test Procedures

Leakage Current:
Leakage current ("DCL") was measured using a leakage test set that measures leakage current at a temperature of 25° C. and at the rated voltage after a minimum of 20 seconds.
Capacitance
The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.
Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency was 100 kHz and the temperature was 23° C.±2° C.
Temperature Cycle Testing:
Ten (10) samples of the capacitor were soldered onto a testing plate and put into an oven. The oven was then cycled one thousand (1000) times between a temperature of between −55° C. and 175° C.

Example 1

Capacitors were formed from tantalum powder having a specific charge of about 70,000 CV/g, which was pressed into pellet samples having a length of 1.85 mm, a width of 2.5 mm, and a thickness of 0.45 mm. Each anode was embedded with a tantalum wire and sintered at 1295° C. for 10 minutes. To anodize the tantalum anode, it was dipped into an orthophosphoric acid/water solution having at temperature of 85° C. to make capacitors with 47 microfarads at 120 Hz. A conductive polymeric cathode was then formed using sequentially applied CLEVIOS™ C (iron III toluene-sulfonate) and CLEVIOS™ M (3,4-ethylene dioxythiophene). More specifically, CLEVIOS™ C was dissolved in a butanol solvent and applied to the pellets as a dipping solution. The pellets were then dried to remove the solvent therefrom. Thereafter, the pellets were dipped into a solution containing CLEVIOS™ M. The pellets were then re-anodized in 0.1% phosphoric acid and dried at room temperature for two (2) hours. Eight (8) repeated sequential dips were performed to build up a consistent polymer outer layer. External carbon and silver coats were formed for finishing the manufacturing process of the anodes.

A standard copper-based leadframe was used to finish the assembly process. One portion of the leadframe was attached to the lower surface of the capacitor element with a silver adhesive. The tantalum wire of the capacitor element was then laser welded to another portion of the leadframe. Once the capacitor element was attached, the leadframe was encapsulated with an epoxy resin. The exposed portions were bent along the outside of the case to form the anode and cathode connective members. The anode and cathode connective members were then glued to gold anode and cathode portions, respectively, of a termination located inside a ceramic housing having a length of 11.00 mm, a width of 6.00 mm, and a thickness of 2.20 mm with gold plated solder pads on the bottom inside part of ceramic housing. The adhesive employed for these connections was a tin solder paste ($SnAg_3Cu_{0.5}$—Avantec Ecorel Free 305) and the adhesive was applied only between the leadframe portions and ceramic housing gold plated solder pads. The assembly was then loaded in a convection reflow oven to solder the paste. After reflow, a Kovar® lid having a length of 9.95 mm, a width of 4.95 mm, and a thickness of 0.10 mm was placed over the top of the container, closely on the seal ring of the ceramic housing (Kovar® ring having a thickness of 0.30 mm) so that there was no direct contact between the interior surface of the lid and the exterior surface of the attached capacitor. The resulting assembly was placed into a welding chamber and purged with nitrogen gas for 120 minutes before seam welding between seal ring and the lid was performed. No additional burn-in or healing was performed after the seam welding. Comparative samples were also made that were not purged with nitrogen gas.

The parts were then tested for electrical performance (i.e., leakage current ("DCL"), capacitance, capacitance ("CAP"), and equivalent series resistance ("ESR"), before and after "temperature cycling" as described above. The median results are shown below.

| Sample | Before Temperature Cycling | | | After Temperature Cycling | | | | | |
|---|---|---|---|---|---|---|---|---|---|
| | DCL (μA) | CAP (μF) | ESR (mΩ) | DCL (μA) | CAP (μF) | ESR (mΩ) | ΔDCL | ΔCAP | ΔESR |
| Example 1 | 31.5 | 41.1 | 67 | 97.1 | 40.9 | 225 | 65.6 | −0.2 | 158 |
| Comparative | 8.1 | 41.0 | 58 | 0.7 | 0.1 | 392000 | −7.4 | −40.9 | 391942 |

As indicated, the ESR value was significantly increased after temperature cycle testing for the capacitor assemblies lacking the inert atmosphere.

Example 2

Capacitors were formed from tantalum powder having a specific charge of 150,000 CV/g), which was pressed into pellet samples having a length of 1.8 mm, a width of 2.4 mm, and a thickness of 0.85 mm). Each anode was embedded with a tantalum wire and sintered at 1270° C. for 10 minutes. To anodize the tantalum anode, it was dipped into an orthophosphoric acid/water solution having at temperature of 85° C. to make capacitors with 150 microfarads at 120 Hz. A conductive polymeric cathode was then formed using sequentially applied CLEVIOS™ C and CLEVIOS™ M. More specifically, CLEVIOS™ C was dissolved in a butanol solvent and applied to the pellets as a dipping solution. The pellets were then dried to remove the solvent therefrom. Thereafter, the pellets were dipped into a solution containing CLEVIOS™ M. The pellets were then re-anodized in 0.1% phosphoric acid and dried at room temperature for two (2) hours. Ten (10) repeated sequential dips were performed to build up a consistent polymer outer layer. External carbon and silver coats were formed for finishing the manufacturing process of the anodes.

The capacitor elements were then attached to a leadframe, encapsulated, and connected to a ceramic housing as described in Example 1. The resulting assembly was purged with nitrogen gas for 120 minutes before seam welding of the lid was performed. Comparative samples were also made that were not purged with nitrogen gas. The parts were then tested for electrical performance before and after "temperature cycling" as described above. The median results are shown below.

As indicated, the ESR value was significantly increased after temperature cycle testing for the capacitor assemblies lacking the inert atmosphere.

Example 3

Capacitors were formed from tantalum powder having a specific charge of 18,000 CV/g), which was pressed into pellet samples having a length of 1.8 mm, a width of 2.4 mm, and a thickness of 0.5 mm). Each anode was embedded with a tantalum wire and sintered at 1500° C. for 20 minutes. To anodize the tantalum anode, it was dipped into an orthophosphoric acid/water solution having at temperature of 85° C. to make capacitors with 2.2 microfarads at 120 Hz. The samples were dipped into a conventional aqueous solution of manganese(II) nitrate and dried to achieve a manganese dioxide cathode. All parts were then dipped sequentially into a graphite dispersion and in a silver dispersion and dried.

The capacitor elements were then attached to a leadframe, encapsulated, and connected to a ceramic housing as described in Example 1. The resulting assembly was purged with nitrogen gas for 120 minutes before seam welding of the lid was performed. Comparative samples were also made that were not purged with nitrogen gas. The parts were then tested for electrical performance before and after "temperature cycling" as described above. The median results are shown below.

| Sample | Before Temperature Cycling | | | After Temperature Cycling | | | | | |
|---|---|---|---|---|---|---|---|---|---|
| | DCL (μA) | CAP (μF) | ESR (mΩ) | DCL (μA) | CAP (μF) | ESR (mΩ) | ΔDCL | ΔCAP | ΔESR |
| Example 2 | 6.0 | 138.5 | 94 | 237.0 | 137.3 | 195 | 231.0 | −1.2 | 101 |
| Comparative | 3.5 | 137.6 | 95 | 78.6 | 0.1 | 1000000 | 75.1 | −137.5 | 999905 |

| Sample | Before Temperature Cycling | | | After Temperature Cycling | | | | | |
|---|---|---|---|---|---|---|---|---|---|
| | DCL (µA) | CAP (µF) | ESR (mΩ) | DCL (µA) | CAP (µF) | ESR (mΩ) | ΔDCL | ΔCAP | ΔESR |
| Example 3 | 0.1 | 2.0 | 884 | 0.1 | 2.0 | 1230 | 0.0 | 0.0 | 346 |
| Comparative | 0.0 | 2.1 | 924 | 0.1 | 2.1 | 1430 | 0.1 | 0.0 | 506 |

As indicated, the ESR values slightly increased after temperature cycle testing for the capacitor assemblies.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor assembly comprising:
an electrolytic capacitor that comprises:
   a capacitor element containing an anode body, dielectric, and solid electrolyte overlying the dielectric;
   an anode connective member electrically connected to the anode body of the capacitor element;
   a cathode connective member electrically connected to the solid electrolyte of the capacitor element; and
   a resinous casing that encapsulates the capacitor element yet leaves at least a portion of the anode connective member and the cathode connective member exposed; and
a ceramic housing within which the capacitor is positioned and hermetically sealed, the ceramic housing defining an interior cavity having a gaseous atmosphere, the gaseous atmosphere containing an inert gas.

2. The capacitor assembly of claim 1, further comprising:
an anode termination that is electrically connected to an exposed portion of the anode connective member; and
a cathode termination that is electrically connected to an exposed portion of the cathode connective member.

3. The capacitor assembly of claim 2, wherein a conductive adhesive electrically connects the exposed portion of the anode connective member to the anode termination.

4. The capacitor assembly of claim 2, wherein a conductive adhesive electrically connects the exposed portion of the cathode connective member to the cathode termination.

5. The capacitor assembly of claim 1, wherein an adhesive directly connects a surface of the capacitor to the ceramic housing.

6. The capacitor assembly of claim 1, wherein the anode body includes tantalum or niobium oxide.

7. The capacitor assembly of claim 1, wherein the solid electrolyte includes a conductive polymer.

8. The capacitor assembly of claim 7, wherein the conductive polymer is poly(3,4-ethylenedioxythiophene).

9. The capacitor assembly of claim 1, wherein the inert gas includes nitrogen, helium, argon, xenon, neon, krypton, radon, or combinations thereof.

10. The capacitor assembly of claim 1, wherein inert gases constitute from about 75 wt. % to 100 wt. % of the gaseous atmosphere.

11. The capacitor assembly of claim 1, wherein oxygen constitutes less than about 1 wt. % of the gaseous atmosphere.

12. The capacitor assembly of claim 1, further comprising a lid that is welded or soldered to the ceramic housing.

13. A capacitor assembly comprising:
an electrolytic capacitor that comprises:
   a capacitor element containing an anode body, dielectric, and conductive polymer overlying the dielectric, wherein the anode body includes tantalum or niobium oxide, and wherein the conductive polymer includes poly(3,4-ethylenedioxythiophene);
   an anode connective member electrically connected to the anode body of the capacitor element;
   a cathode connective member electrically connected to the solid electrolyte of the capacitor element; and
   a resinous casing that encapsulates the capacitor element yet leaves at least a portion of the anode connective member and the cathode connective member exposed;
a ceramic housing within which the capacitor is positioned and hermetically sealed, the ceramic housing defining an interior cavity having a gaseous atmosphere, the gaseous atmosphere containing an inert gas;
an anode termination that is electrically connected to an exposed portion of the anode connective member by a conductive adhesive; and
a cathode termination that is electrically connected to an exposed portion of the cathode connective member by a conductive adhesive.

14. The capacitor assembly of claim 13, wherein the inert gas includes nitrogen, helium, argon, xenon, neon, krypton, radon, or combinations thereof.

15. The capacitor assembly of claim 13, wherein inert gases constitute from about 75 wt. % to 100 wt. % of the gaseous atmosphere.

16. The capacitor assembly of claim 13, wherein oxygen constitutes less than about 1 wt. % of the gaseous atmosphere.

17. The capacitor assembly of claim 13, further comprising a lid that is welded or soldered to the ceramic housing.

18. A method of forming a capacitor assembly, the method comprising:
providing a solid electrolytic capacitor that comprises a capacitor element, an anode connective member electrically connected to an anode body of the capacitor element, a cathode connective member electrically connected to a solid electrolyte of the capacitor element, and a resinous casing that encapsulates the capacitor element yet leaves at least a portion of the anode connective member and the cathode connective member exposed; and
positioning the electrolytic capacitor within a ceramic housing;
electrically connecting the anode connective member of the capacitor to an anode termination;

electrically connecting the cathode connective member of the capacitor to a cathode termination;
positioning a lid over the ceramic housing; and
hermetically sealing the lid to the ceramic housing in the presence of a gaseous atmosphere containing an inert gas.

19. The method of claim 18, wherein the solid electrolyte includes poly(3,4-ethylenedioxythiophene).

20. The method of claim 18, wherein inert gases constitute from about 75 wt. % to 100 wt. % of the gaseous atmosphere and oxygen constitutes less than about 1 wt. % of the gaseous atmosphere.

* * * * *